No. 734,609.

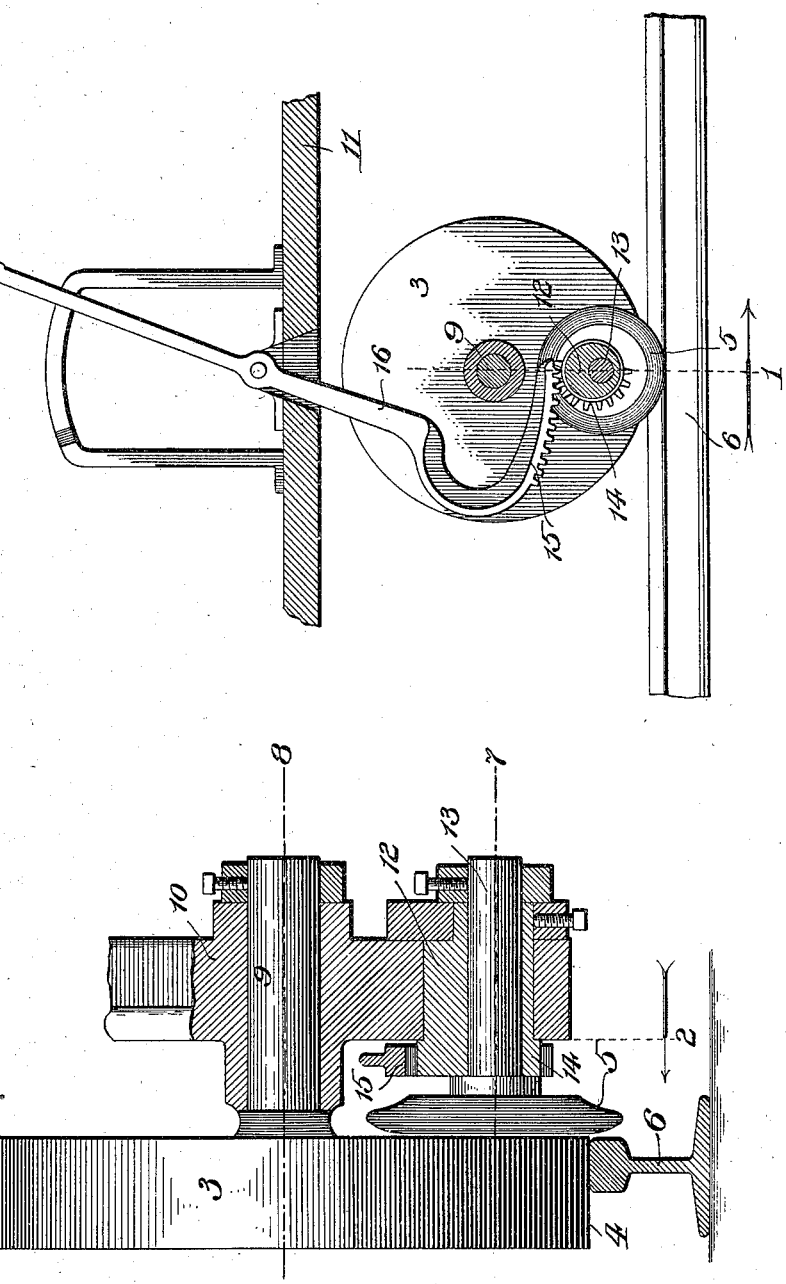

Patented July 28, 1903.

UNITED STATES PATENT OFFICE.

HENRY H. PORTER, JR., OF CHICAGO, ILLINOIS, ASSIGNOR TO SWANITZ COMPANY, OF CHICAGO, ILLINOIS, A CORPORATION OF DELAWARE.

WHEEL.

SPECIFICATION forming part of Letters Patent No. 734,609, dated July 28, 1903.

Application filed December 24, 1901. Serial No. 87,126. (No model.)

*To all whom it may concern:*

Be it known that I, HENRY H. PORTER, Jr., a citizen of the United States, residing at Chicago, in the county of Cook and State of Illinois, have invented certain new and useful Improvements in Wheels, (Case No. 4,) of which the following, taken in connection with the accompanying drawings, is a specification.

This invention has reference particularly to the provision of an improvement in wheels, having for its object the construction of a wheel which can be used on a plane traction-surface or road-bed or upon a rail, as occasion may require, so that it can be employed for trucks or vehicles designed to run on smooth surfaces and also upon railroad-tracks, as necessity may require.

A further object of my invention is the provision of a wheel which, so far as its service upon a smooth surface is concerned, will be practically a flangeless wheel, and yet which when it is desired to use it upon a rail-surface or railroad-track can be made to answer the requirements of such service by the operation of mechanism which will project into operative position a rotatable flange-disk to act as a guide for the wheel upon the rail.

Another specific object of my invention is the provision of a wheel having a rotatable flanged disk structurally separate from the wheel.

The above, as well as such other objects as may hereinafter appear, I attain by means of a construction which I have illustrated in preferred form in the accompanying drawings, in which—

Figure 1 is a view, partly in section, showing a wheel with my improvements applied thereto; and Fig. 2 is another view, partly in section, showing an operative means which may be employed in conjunction with my improved rotatable flange device.

As shown in the accompanying drawings, I have provided first a wheel 3, having a plane tread-surface 4, which, it will be apparent, can be run upon a smooth floor or even surface, if the flange-disk 5 with which it is provided is not projected below the surface of the wheel, as it is in the position shown in Figs. 1 and 2. The flange-disk 5 when in the position shown in the drawings acts as a guide or guard against the rail 6 in a manner which will be clear without further explanation and rotates as the wheel revolves, but, as shown, upon a different center of rotation, the axis of rotation of the disk 5, as shown, being the line 7, while the axis of rotation of the wheel is the center-line 8.

For convenience of illustration I have shown the wheel 3 as mounted upon an axle 9, carried in a bracket 10, secured to the body 11 of the truck or vehicle, the bracket 10 being projected or extended downwardly to form a bearing for the eccentric 12, through which passes the axle 13, which carries the flange-disk 5. The eccentric 12 is provided with a segmental gear 14, engaging another segmental gear 15 upon the lower end of a lever 16, the upper end 17 whereof projects into position above the truck, where it can be readily manipulated by the operator. In the position of the lever shown in Fig. 2 the flange-disk 5 is projected into operative position, as shown in both of the views of the drawings, while if the lever were to be thrown to the left side in Fig. 2 the rotation of the eccentric 12 would retract the flange-disk 5 or draw it up to a position in which it would no longer project beyond the plane of the periphery of the tread portion of the wheel 3. When so retracted, the wheel 3 would therefore be free to run upon a smooth or plane surface without interference from the flange-disk 5.

It is obvious that there are many other specific ways of embodying my improvements in an operative device, and I desire to be understood as including all equivalent constructions as within the scope of my claims, (the primary object of the invention being to provide a wheel mechanism which is adapted to run on plane surfaces or surfaces free from rails and which is also adapted to run on rails, whether said rails be of special construction or of the usual form with frogs and switches,) which are as follows:

1. A wheel provided with a movable flange-disk of less than half the diameter of the wheel, said flange-disk being eccentrically mounted upon a shaft, and means for moving said disk about its shaft to protrude it outside the edge of the tread of said wheel.

2. A wheel provided with a flange-disk rigidly supported from the axle of the wheel and mounted in said support upon an eccentric axis, combined with means operated by a lever for turning the disk upon its axis to shift it into place to act as a flange of the first-mentioned wheel.

In testimony whereof I have hereunto set my hand in the presence of two subscribing witnesses.

HENRY H. PORTER, JR.

Witnesses:
PAUL CARPENTER,
H. W. SMALLEY.